United States Patent
Inoue (10) Patent No.: US 7,794,891 B2
(45) Date of Patent: Sep. 14, 2010

(54) FUEL CELL WITH INTERWEAVING CURRENT COLLECTOR AND MEMBRANE ELECTRODE ASSEMBLY

(75) Inventor: Masajiro Inoue, Tochigi-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 760 days.

(21) Appl. No.: 11/376,877

(22) Filed: Mar. 15, 2006

(65) Prior Publication Data
US 2006/0210865 A1    Sep. 21, 2006

(30) Foreign Application Priority Data
Mar. 17, 2005    (JP) ............................. 2005-076179

(51) Int. Cl.
*H01M 8/24* (2006.01)
*H01M 4/86* (2006.01)
(52) U.S. Cl. ..................... 429/483; 429/507; 429/523; 429/457; 429/465
(58) Field of Classification Search ....................... None
See application file for complete search history.

(56) References Cited

U.S. PATENT DOCUMENTS 7,201,986 B2 * 4/2007 McLean ...................... 429/34
7,390,586 B2 * 6/2008 Gallagher et al. ............. 429/26
2002/0081477 A1 * 6/2002 McLean et al. ............... 429/34
2004/0166393 A1 * 8/2004 Akita et al. ................... 429/38

FOREIGN PATENT DOCUMENTS

JP    06-060905    3/1994

* cited by examiner

*Primary Examiner*—Keith Walker
(74) *Attorney, Agent, or Firm*—Fish & Richardson P.C.

(57) ABSTRACT

An electrolyte membrane/electrode web member includes an elongated solid polymer electrolyte membrane. A plurality of anodes and a plurality of cathodes are provided on one surface, and on the other surface of the solid polymer electrolyte membrane, respectively. First and second gas diffusion current collector members are inserted into the electrolyte membrane/electrode web member from both sides. Each of the first and second gas diffusion current collector members is formed by folding a single electrically conductive plate into a substantially U-shape. Electrical insulation is provided by interposing the insulating member between the first and second gas diffusion current collector members.

14 Claims, 9 Drawing Sheets

FUEL CELL WITH INTERWEAVING CURRENT COLLECTOR AND MEMBRANE ELECTRODE ASSEMBLY

BACKGROUND OF THE INVENTION

1. Field of the Invention

The present invention relates to a fuel cell including a plurality of unit cells, formed by sandwiching an elongated electrolyte membrane/electrode web member by gas diffusion current collector members. A plurality of anodes and cathodes are provided on both surfaces of the electrolyte membrane/electrode web member.

2. Description of the Related Art

For example, a polymer electrolyte fuel cell employs a membrane electrode assembly (MEA) which includes an anode, a cathode, and an electrolyte membrane interposed between the anode and the cathode. The electrolyte membrane is a solid polymer ion exchange membrane. The membrane electrode assembly and separators sandwiching the membrane electrode assembly make up a unit of a power generation cell for generating electricity. Normally, a predetermined number of the power generation cells are stacked together to form a fuel cell stack.

In the fuel cell, a fuel gas such as a gas chiefly containing hydrogen (hereinafter also referred to as the "hydrogen-containing gas") is supplied to the anode. A gas chiefly containing oxygen or the air (hereinafter also referred to as the "oxygen-containing gas") is supplied to the cathode. The catalyst of the anode induces a chemical reaction of the fuel gas to split the hydrogen molecule into hydrogen ions and electrons. The hydrogen ions move toward the cathode through the electrolyte membrane, and the electrons flow through an external circuit to the cathode, creating DC electrical energy.

In particular, in the case where the fuel cells are stacked together to form a fuel cell stack used in a vehicle application, it is desirable to reduce the overall size (height) of the stack for efficiently utilize the limited space in the vehicle.

Figure 9:
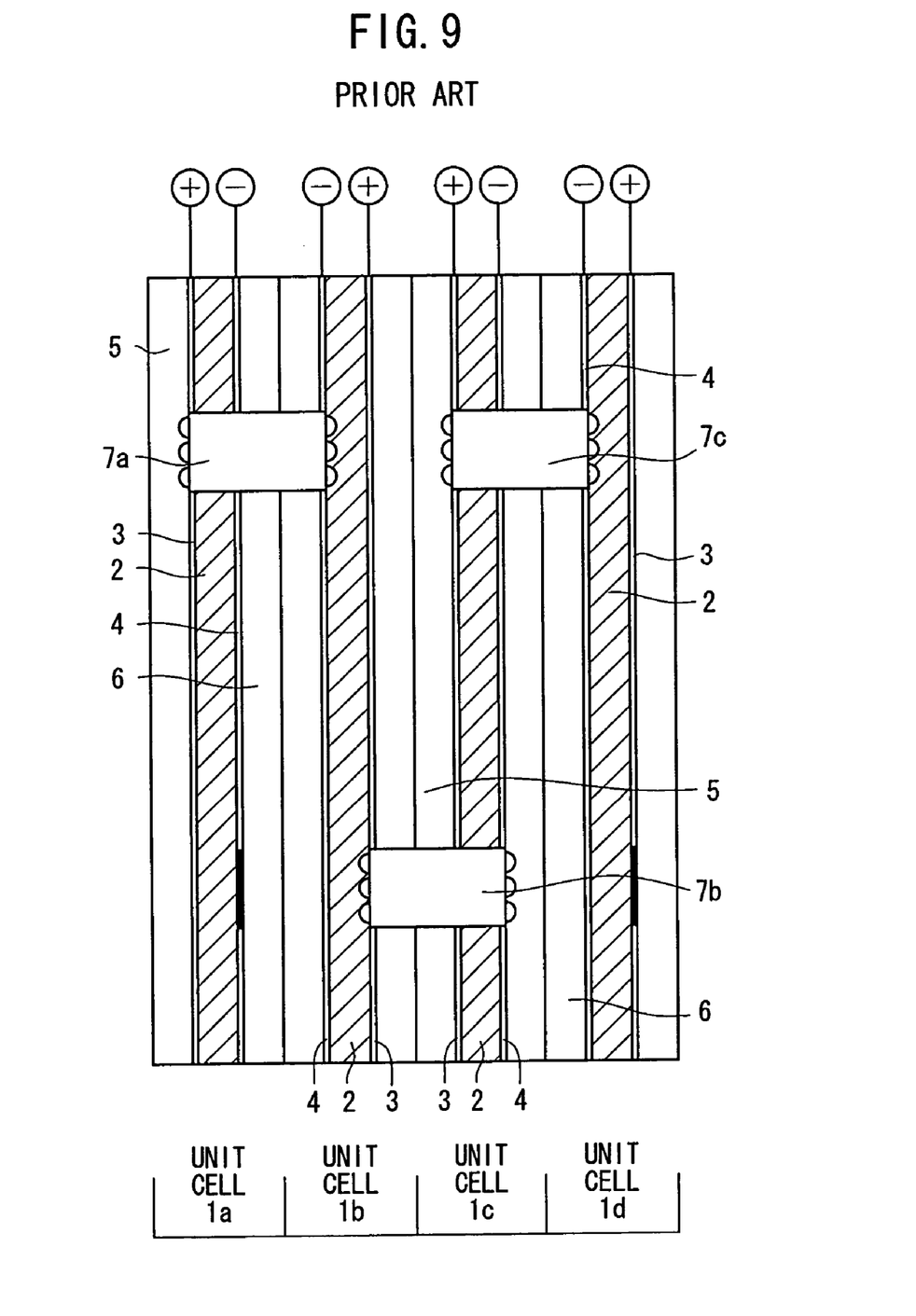
FIG. 9 is a view showing a conventional fuel cell.

In this regard, for example, a fuel cell disclosed in Japanese Laid-Open Patent Application No. 6-60905 is known. As shown in FIG. 9, in the fuel cell, a plurality of unit cells 1a, 1b, 1c, and 1d are stacked together. Each of the unit cells 1a to 1d has an air electrode 3, a fuel electrode 4, and an electrolyte 2 interposed between the air electrode 3 and the fuel electrode 4. An air electrode chamber 5 is provided at the air electrode 3, and a fuel electrode chamber 6 is provided at the fuel electrode 4.

The unit cell 1a and the unit cell 1b use the fuel electrode chamber 6 in common. The unit cell 1b and the unit cell 1c use the air electrode chamber 5 in common. Further, the unit cell 1c and the unit cell 1d use the fuel electrode chamber 6 in common.

The air electrode 3 of the unit cell 1a and the fuel electrode 4 of the unit cell 1b are connected by a current collector connector 7a, and the air electrode 3 of the unit cell 1b and the fuel electrode 4 of the unit cell 1c are connected by a current collector connector 7b. Further, the air electrode 3 of the unit cell 1c and the fuel electrode 4 of the unit cell 1d are connected by a current collector connector 7c. In this manner, the unit cells 1a to 1d are connected in series through the current collector connectors 7a to 7c.

In the fuel cell, each of the unit cells 1a to 1d comprises a unit of the air electrode 3, the fuel electrode 4, and the electrolyte 2. The unit cells 1a to 1d are arranged in a predetermined direction, and stacked together. In order to connect the unit cells 1a to 1d together in series, operation for attaching the current collector connectors 7a to 7c is required. Consequently, the assembling operation of the fuel cell stack is significantly complicated, and time consuming. Thus, productivity for the fuel cell stack is low.

Further, since the unit cells 1a to 1d are connected in series through the current collector connectors 7a to 7c as separate components, the electrical resistance is large, and the number of components of the fuel cell stack is considerably large.

SUMMARY OF THE INVENTION

A main object of the present invention is to provide a fuel cell with a plurality of unit cells having economical and compact structure in which it is possible to achieve easy, rapid assembling operation, improved productivity, and desired performance.

According to the present invention, a fuel cell includes an electrolyte membrane/electrode web member, first and second gas diffusion current collector members, and an electrically insulating member. The electrolyte membrane/electrode web member includes at least two anodes separately provide on one surface of an elongated electrolyte membrane, and at least two cathodes separately provided on the other surface of the elongated electrolyte membrane. Each of the first and second gas diffusion current collector members is formed by folding a single electrically conductive plate into a substantially U-shape, and has at least one porous surface facing the electrolyte membrane/electrode web member. A reactant gas flow field is formed between the insulating member and the porous surface of the gas diffusion current collector member.

Each of the anode and the cathode comprises an electrode layer having a predetermined area on the elongated electrolyte membrane, and the electrode layer includes an electrode catalyst layer and a gas diffusion layer on which the electrode catalyst layer is disposed.

The electrolyte membrane/electrode web member is curved or bent in a wave shape such that the anode and the cathode are arranged in parallel to each other. The first gas diffusion current collector member is inserted into the electrolyte membrane/electrode web member from one side to sandwich the electrolyte membrane/electrode web member, and the second gas diffusion current collector member is inserted into the electrolyte membrane/electrode web member from the other side to sandwich the electrolyte membrane/electrode web member. The insulating member is placed in a space where the first gas diffusion current collector member and the second gas diffusion current collector member directly face each other.

Preferably, a plurality of protrusions are formed on both surfaces of the insulating member, and the protrusions contact the gas diffusion current collector member to form the reactant gas flow field.

Preferably, a reactant gas passage connected to the reactant gas flow field, and extending through the gas diffusion current collector member in a stacking direction is provided for allowing a reactant gas to flow through the reactant gas passage.

Further, preferably, a coolant passage extending through the gas diffusion current collector member in a stacking direction is provided for allowing a coolant to flow through the coolant passage.

In the present invention, the anodes and the cathodes are formed on both surfaces of the elongated electrolyte membrane. Thus, by folding the elongated electrolyte membrane in a wave shape, it is possible to arrange the anodes and the cathodes in the desired orientation. In the structure, simply by inserting the gas diffusion current collector members each having the substantially U-shape from both sides of the elongated electrolyte membrane, in effect, a plurality of unit cells can be stacked together easily and rapidly. Each of the unit cells includes the membrane electrode assembly unit and gas diffusion current collector members sandwiching the membrane electrode assembly unit, and the membrane electrode assembly unit includes the anode, the cathode, and the electrolyte membrane interposed therebetween.

Further, each of the gas diffusion current collector members is formed by folding the single electrically conductive plate in the substantially U-shape. Thus, electrons flow from the anode to the cathode through the electrically conductive plate itself, and it is possible to effectively reduce the electrical resistance. Further, simply by supplying the coolant along the folded positions of the electrically conductive plate, the metal thermal conductivity is utilized to achieve the uniform temperature in the surfaces of the gas diffusion current collector members.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
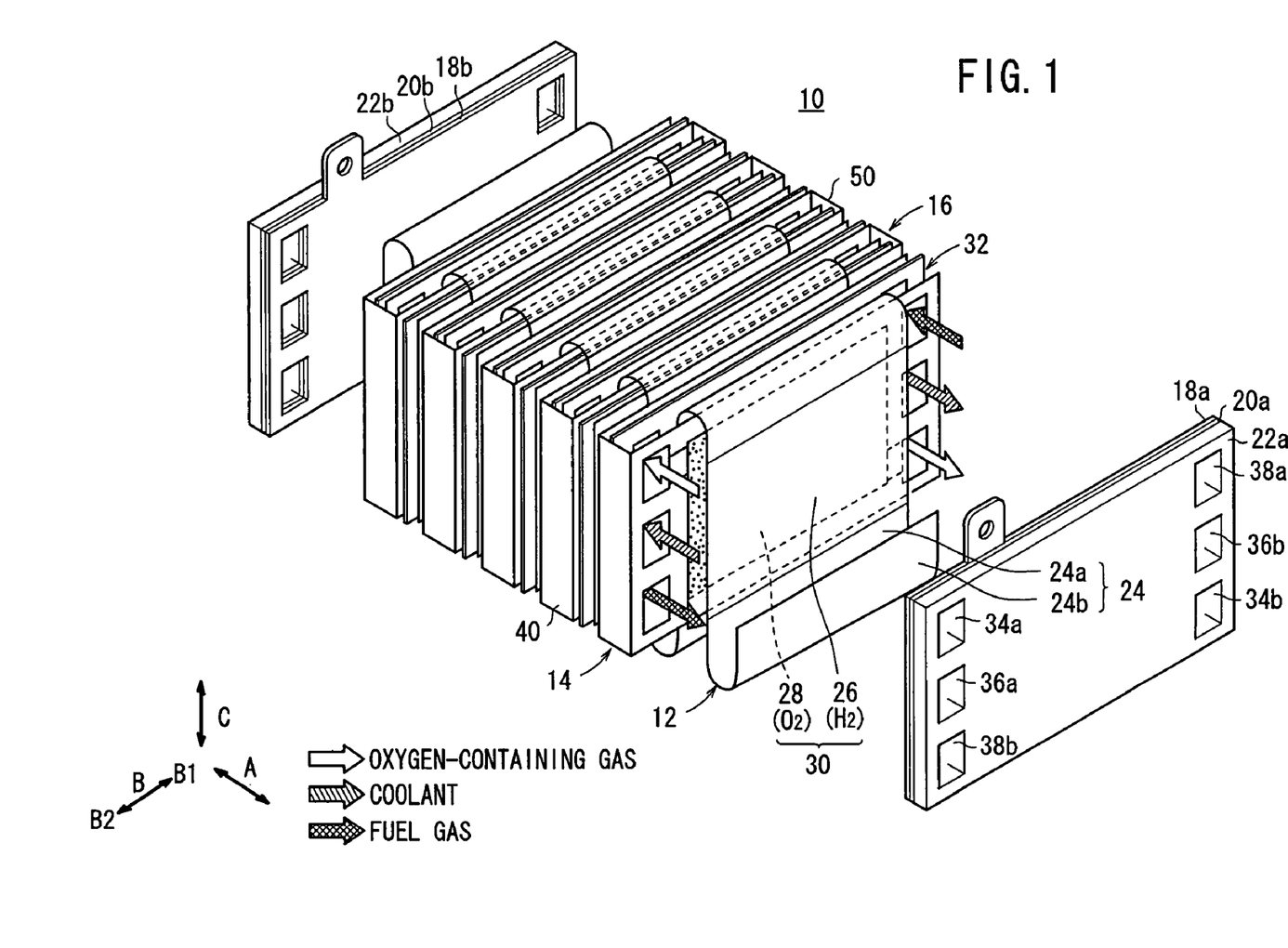
FIG. 1 is a view schematically showing structure of a fuel cell according to an embodiment of the present invention.
Figure 2:
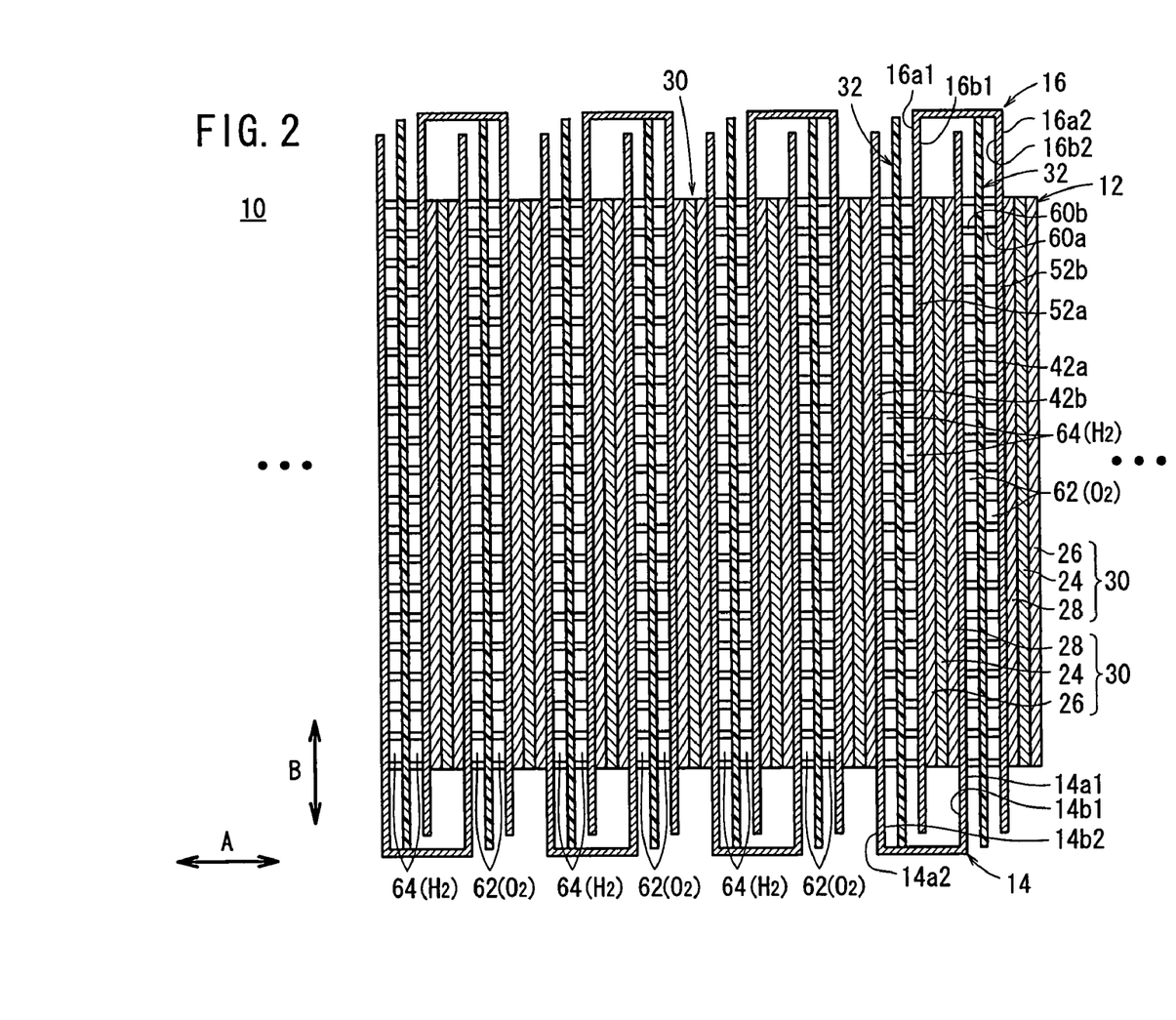
FIG. 2 is a cross sectional view showing the fuel cell.

FIG. 1 is a view schematically showing structure of a fuel cell 10 according to an embodiment of the present invention. FIG. 2 is a cross sectional view showing the fuel cell 10.

For example, the fuel cell 10 is mounted on a vehicle such as an automobile. The fuel cell 10 has multi-layer structure like a fuel cell stack. The fuel cell 10 includes an electrolyte membrane/electrode web member 12, and first and second gas diffusion current collector members 14, 16 each having a substantially U-shape. The first and second gas diffusion current collector members 14, 16 facing each other are inserted into the electrolyte membrane/electrode web member 12 from both sides of the electrolyte membrane/electrode web member 12 in directions indicated by arrows B1 and B2. Thus, a plurality of layers of the first and second gas diffusion current collector members 14, 16 are stacked together in a direction indicated by an arrow A.

As shown in FIG. 1, at opposite ends of the fuel cell 10 in the stacking direction indicated by the arrow A, terminal plates 18a, 18b are provided. Insulating plates 20a, 20b are provided outside the terminal plates 18a, 18b. Further, end plates 22a, 22b are provided outside the insulating plates 20a, 20b. For example, components of the fuel cell 10 are tightened together by a plurality of tie rods (not shown) in the stacking direction. Alternatively, the fuel cell 10 may be placed in a box-shaped casing (not shown) including the end plates 22a, 22b.

Figure 3:
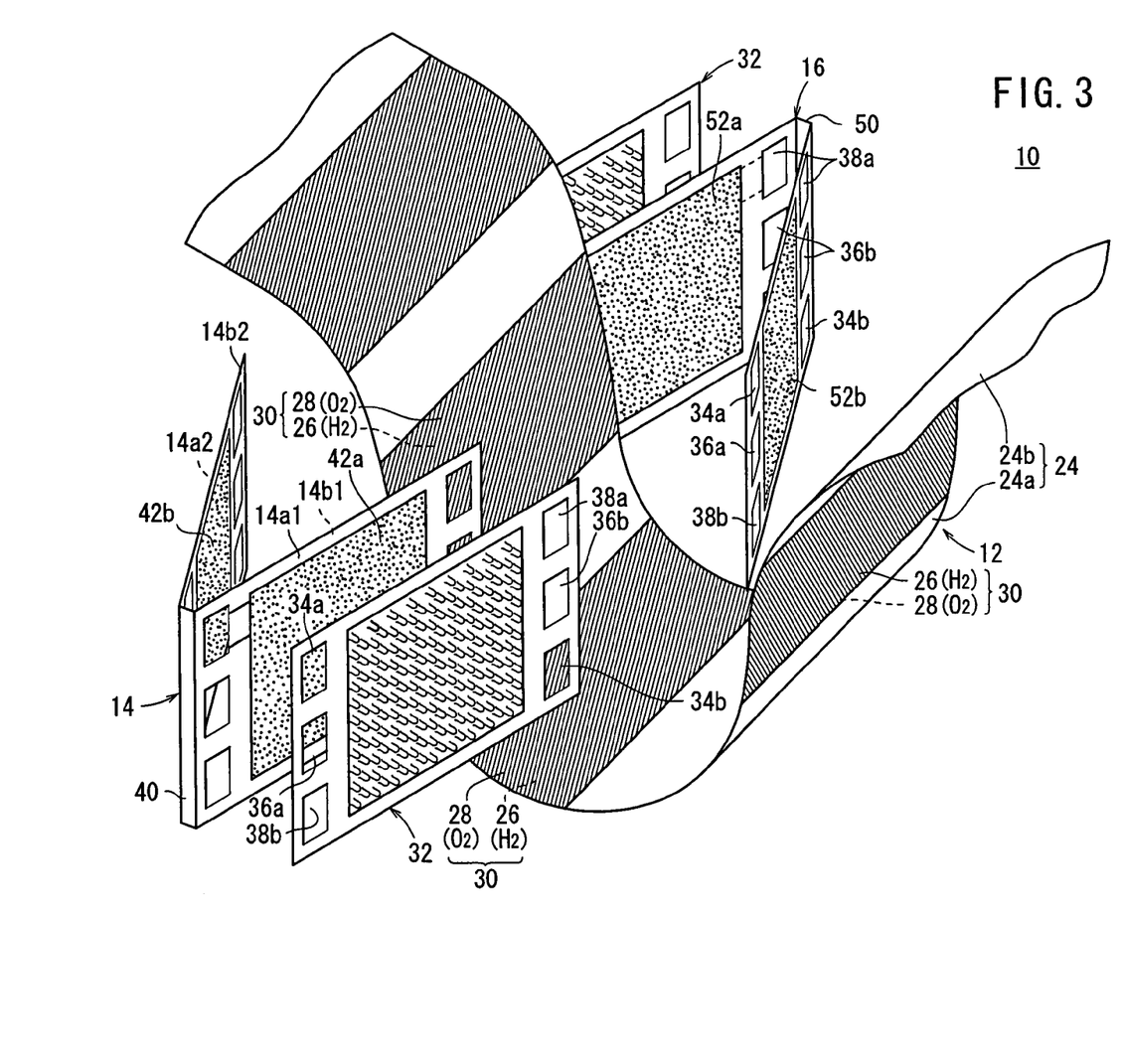
FIG. 3 is a perspective view showing an electrolyte membrane/electrode web member, first and second gas diffusion current collector members, and insulating members of the fuel cell.

As shown in FIG. 3, the electrolyte membrane/electrode web member 12 includes an elongated solid polymer electrolyte membrane (elongated electrolyte membrane) formed by impregnating a thin membrane of a perfluorosulfonic acid with water, for example. A plurality of anodes 26 are provided on one surface 24a of the solid polymer electrolyte membrane 24 at predetermined intervals, and a plurality of cathodes 28 are provided on the other surface 24b of the solid polymer electrolyte membrane 24, at positions corresponding to the positions of the anodes 26.

Figure 4:
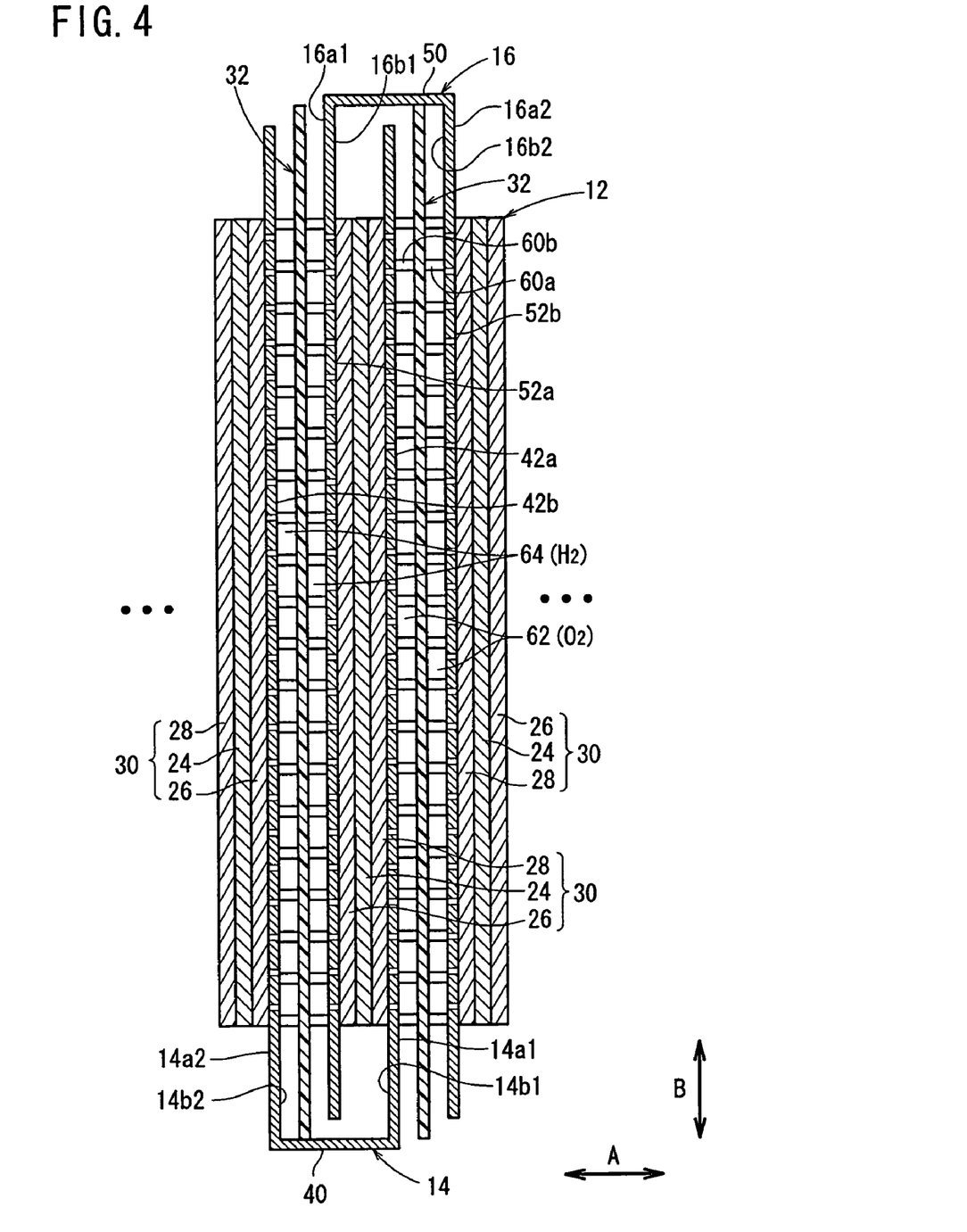
FIG. 4 is a partial enlarged cross sectional view showing the fuel cell.

The electrolyte membrane/electrode web member 12 includes a plurality of membrane electrode assembly units 30 at predetermined intervals. Each of the membrane electrode assembly units 30 includes the anode 26 and the cathode 28 on both surfaces of the solid polymer electrolyte membrane 24. As shown in FIGS. 2 and 4, electrically insulating members 32 are provided at positions between the respective membrane electrode assembly units 30. As described later, the insulating member 32 forms a reactant gas flow field.

Each of the anode 26 and the cathode 28 has a gas diffusion layer (not shown) such as a carbon paper, and an electrode catalyst layer (not shown) of platinum alloy carried on porous carbon particles. The carbon particles are deposited uniformly on the surface of the gas diffusion layer. The electrode catalyst layer of the anode 26 and the electrode catalyst layer of the cathode 28 are fixed to both surfaces of the solid polymer electrolyte membrane 24, respectively. The anode 26 and the cathode 28 may not include the gas diffusion layers. In this case, the first and second gas diffusion current collector members 14, 16 themselves are used as the gas diffusion layers.

Figure 5:
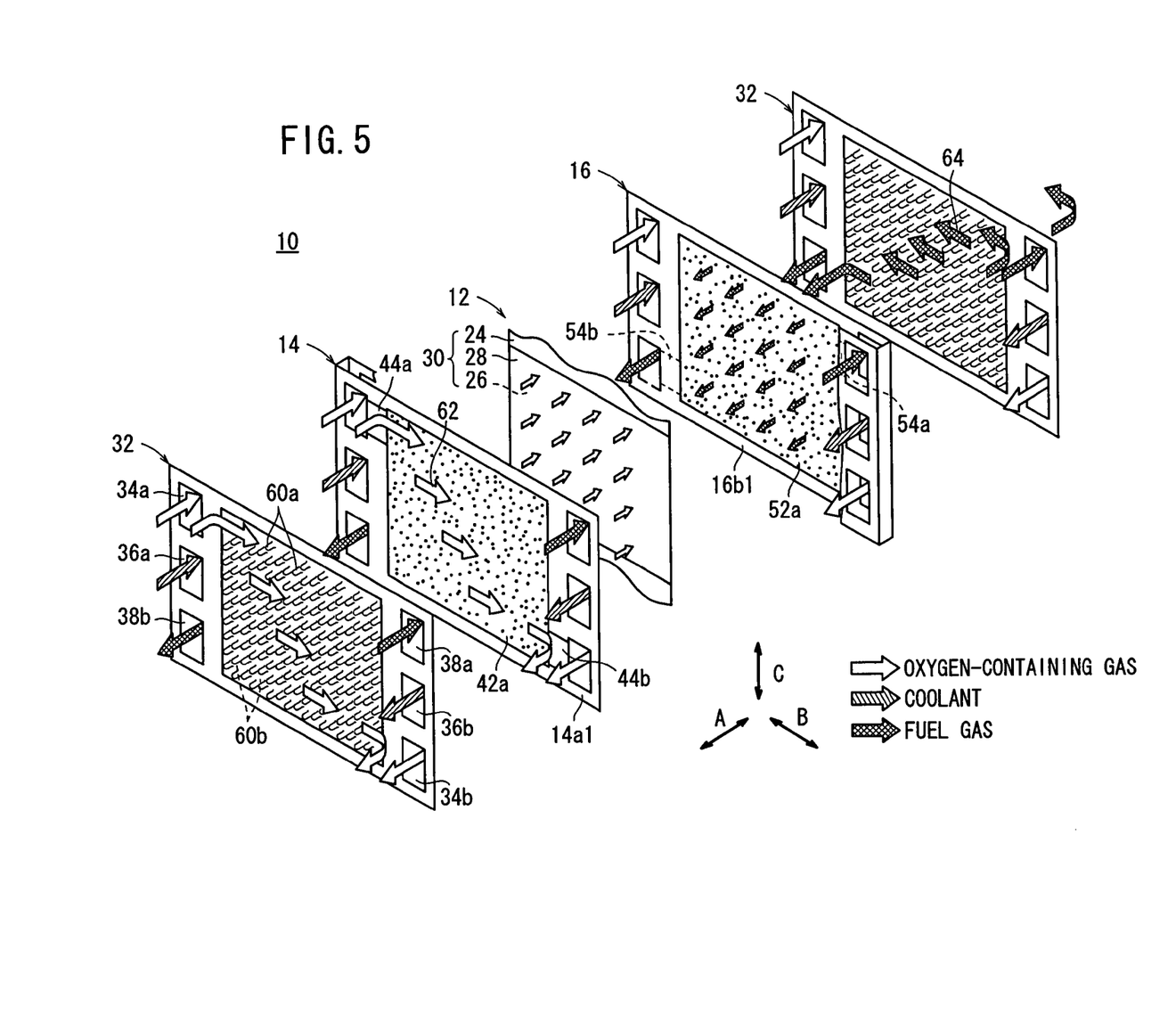
FIG. 5 is a view showing flows of reactant gases and a coolant in the fuel cell.

As shown in FIG. 5, at one end of the first and second gas diffusion current collector members 14, 16 and the insulating members 32 in the direction indicated by the arrow B, an oxygen-containing gas supply passage 34a for supplying an oxygen-containing gas, a coolant supply passage 36a for supplying a coolant, and a fuel gas discharge passage 38b for discharging a fuel gas such as a hydrogen-containing gas are arranged in a vertical direction indicated by an arrow C. The oxygen-containing gas supply passage 34a, the coolant supply passage 36a, and the fuel gas discharge passage 38b extend through the first and second gas diffusion current collector members 14, 16 and the insulating members 32 in the direction indicated by the arrow A.

At the other end of the first and second gas diffusion current collector members 14, 16 and the insulating members 32 indicated by the arrow B, a fuel gas supply passage 38a for supplying the fuel gas, a coolant discharge passage 36b for discharging the coolant, and an oxygen-containing gas discharge passage 34b for discharging the oxygen-containing gas are arranged in the direction indicated by the arrow B. The fuel gas supply passage 38a, the coolant discharge passage 36b, and the oxygen-containing gas discharge passage 34b extend through the first and second gas diffusion current collector members 14, 16 and the insulating members 32 in the direction indicated by the arrow A.

Figure 6:
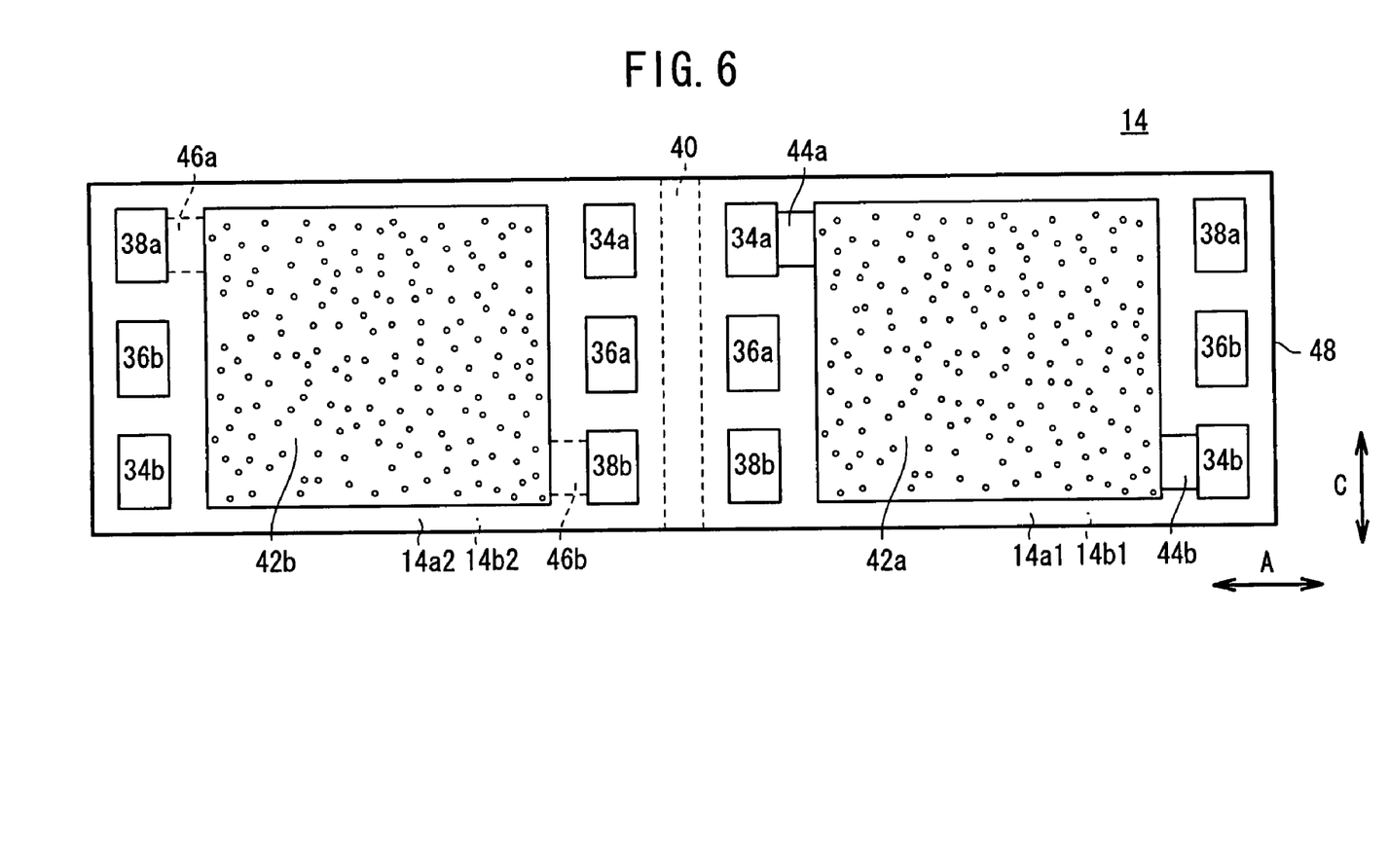
FIG. 6 is a view showing a state in which the first gas diffusion current collector member is unfolded.

As shown in FIGS. 4 and 6, the first gas diffusion current collector member 14 is formed by folding a single electrically conductive plate into a substantially U-shape. In a state where the first gas diffusion current collector member 14 is unfolded, an end surface 40 is provided at a substantially central position of the first gas diffusion current collector member 14 in the longitudinal direction. The first gas diffusion current collector member 14 has porous surfaces 42a, 42b on both sides of the end surface 40, in areas substantially equal to the anode 26 and the cathode 28. A large number of apertures are formed on the porous surfaces 42a, 42b of the first gas diffusion current collector member 14. The porous surfaces 42a, 42b may be fitted to the insulating members 32. The first gas diffusion current collector member 14 is folded back to have the substantially U-shape such that both sides of the end surface 40 become parallel. In this state, outer surfaces on both sides of the end surface 40 are referred to as the surfaces 14a1, 14a2, and inner surfaces thereof are referred to as the surfaces 14b1, 14b2.

As shown in FIG. 6, on the surface 14a1, an inlet channel 44a connecting the oxygen-containing gas supply passage 34a and the porous surface 42a, and an outlet channel 44b connecting the porous surface 42a and the oxygen-containing gas discharge passage 34b are formed. On the surface 14b2, an inlet channel 46a connecting the fuel gas supply passage 38a and the porous surface 42b, and an outlet channel 46b connecting the porous surface 42b and the fuel gas discharge passage 38b are formed.

The inlet channels 44a, 46a and the outlet channels 44b, 46b are formed by providing a seal member 48 integrally with the first gas diffusion current collector member 14, around the outer end of the first gas diffusion current collector member 14. Alternatively, instead of providing the seal member 48, separate seals such as gaskets (not shown) may be used. The second gas diffusion current collector member 16 has the same structure.

Figure 7:
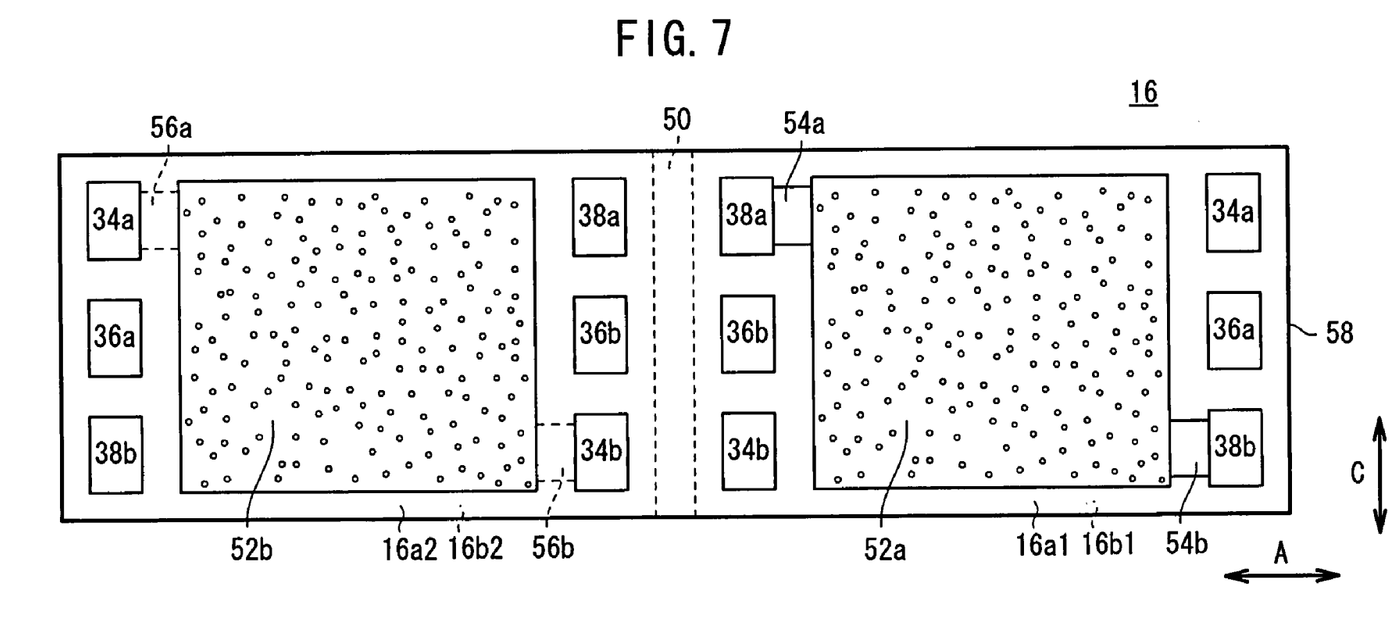
FIG. 7 is a view showing a state in which the second gas diffusion current collector member is unfolded.

As shown in FIGS. 4 and 7, the second gas diffusion current collector member 16 is formed by folding a single electrically conductive plate into a substantially U-shape. In a state where the second gas diffusion current collector member 16 is unfolded, an end surface 50 is provided at a substantially central position of the second gas diffusion current collector member 16 in the longitudinal direction. In the state where the second gas diffusion current collector member 16 is folded back, outer surfaces on both sides of the end surface 50 are referred to as the surfaces 16a1, 16a2, and inner surfaces thereof are referred to as the surfaces 16b1, 16b2. The second gas diffusion current collector member 16 has porous surfaces 52a, 52b on both sides of the end surface 50. A large number of apertures are formed on the porous surfaces 52a, 52b of the second gas diffusion current collector member 16. The porous surfaces 52a, 52b may be fitted to the insulating members 32.

As shown in FIG. 7, on the surface 16a1, an inlet channel 54a connecting the fuel gas supply passage 38a and the porous surface 52a, and an outlet channel 54b connecting the porous surface 52a and the fuel gas discharge passage 38b are formed. On the surface 16b2, an inlet channel 56a connecting the oxygen-containing gas supply passage 34a and the porous surface 52b, and an outlet channel 56b connecting the porous surface 52b and the oxygen-containing gas discharge passage 34b are formed. A seal member 58 is formed integrally with the second gas diffusion current collector member 16 to cover the outer end of the second gas diffusion current collector member 16.

The insulating member 32 is made of resin or the like. At the central portion of the insulating member 32, a plurality of protrusions 60a, 60b are formed integrally on both surfaces, at positions corresponding to the areas of the anode 26 and the cathode 28.

As shown in FIGS. 2 and 4, the surface 14b1 of the first gas diffusion current collector member 14 contacts the cathode 28 of the membrane electrode assembly unit 30, and the surface 14a2 of the first gas diffusion current collector member 14 contacts the anode 26 of an adjacent membrane electrode assembly unit 30. The surface 16b1 of the second gas diffusion current collector member 16 contacts the anode 26 of the membrane electrode assembly unit 30, and the surface 16a2 of the second gas diffusion current collector member 16 contacts the cathode 28 of another adjacent membrane electrode assembly unit 30 on the opposite side.

The surface 14a1 of the first gas diffusion current collector member 14 and the surface 16b2 of the second gas diffusion current collector member 16 directly face each other, and the insulating member 32 is interposed between these surfaces 14a1, 16b2. The protrusions 60a, 60b of the insulating member 32 contact the surfaces 16b2, 14a1 to form the oxygen-containing gas flow field 62. Likewise, the surface 14b2 of the first gas diffusion current collector member 14 and the surface 16a1 of the second gas diffusion current collector member 16 directly face each other, and the insulating member 32 is interposed between these surfaces 14b2, 16a1. The protrusions 60a, 60b of the insulating member 32 contact the surfaces 14b2, 16a1 to form the fuel gas flow field 64.

Next, operation of assembling the fuel cell 10 will be described.

The electrolyte membrane/electrode web member 12 is curved or bent at positions between the respective membrane electrode assembly units 30 into the wave shape. Therefore, the membrane electrode assembly units 30 are arranged substantially in parallel in the direction indicated by the arrow A.

The first gas diffusion current collector member 14 is folded at positions on both sides of the end surface 40 such that the surfaces 14a1, 14a2 become the outer surfaces of the first gas diffusion current collector member 14 having the substantially U-shape. Likewise, the second gas diffusion current collector member 16 is folded at positions on both sides of the end surface 50 such that the surfaces 16a1, 16a2 become the outer surfaces of the second gas diffusion current collector member 16 having the substantially U-shape.

Figure 8:
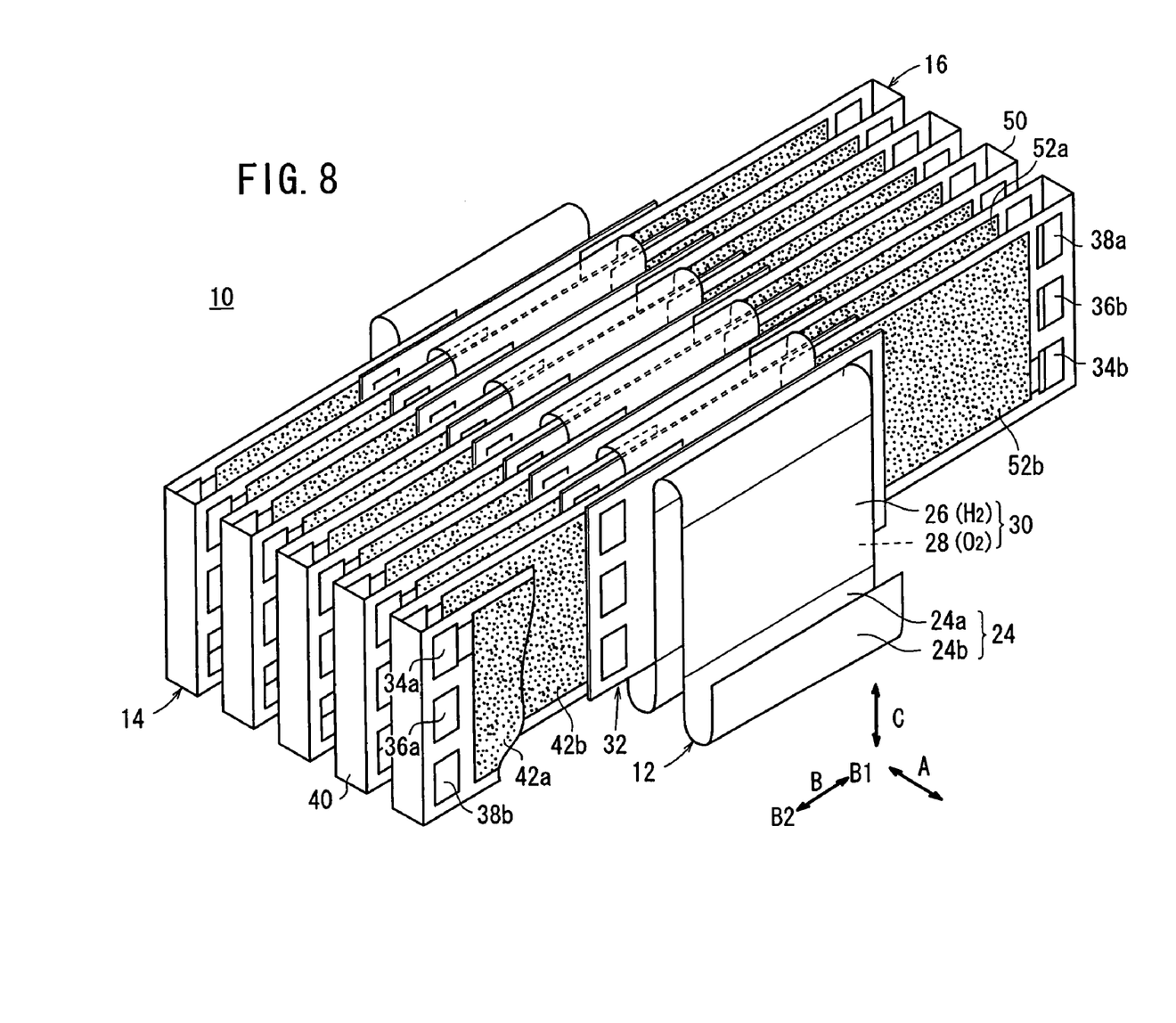
FIG. 8 is a view showing operation of assembling the fuel cell.

Then, as shown in FIG. 8, the first gas diffusion current collector member 14 is inserted into the electrolyte membrane/electrode web member 12 having the wave shape from one side in the direction indicated by the arrow B1 to sandwich the electrolyte membrane/electrode web member 12, in particular, to sandwich one of the membrane electrode assembly units 30. The second gas diffusion current collector member 16 is inserted into the electrolyte membrane/electrode web member 12 from the other side in the direction indicated by the arrow B2 to sandwich the electrolyte membrane/electrode web member 12, in particular, to sandwich one of the membrane electrode assembly unit 30.

As shown in FIGS. 2 and 4, the first and second gas diffusion current collector members 14, 16 sandwich the same membrane electrode assembly unit 30. The legs of the U-shape gas diffusion current collector members 14, 16 are arranged alternately, i.e., each leg of one of the U-shape gas diffusion current collector members 14, 16 are partially inserted into each recess of the other of the U-shape gas diffusion current collector members 14, 16.

Further, the insulating member 32 is provided between the surface 14a1 of the first gas diffusion current collector member 14 and the surface 16b2 of the second gas diffusion current collector member 16 to form the oxygen-containing gas flow field 62 on both surfaces of the insulating member 32. Likewise, the insulating member 32 is provided between the surface 14b2 of the first gas diffusion current collector member 14 and the surface 16a1 of the second gas diffusion current collector member 16 to form the fuel gas flow field 64 on both surfaces of the insulating member 32.

As described above, each of the membrane electrode assembly units 30 of the electrolyte membrane/electrode web member 12 is sandwiched between the first and second gas diffusion current collector members 14, 16. At opposite ends of these components, the terminal plates 18a, 18b, the insulating plates 20a, 20b, and the end plates 22a, 22b are provided. For example, the components between the end plates 22a, 22b are tightened together by tie rods (not shown) to assemble the fuel cell 10 having the multi-layer structure as a stack.

Next, operation of the fuel cell 10 will be described.

As shown in FIG. 1, at the end plate 22a, an oxygen-containing gas is supplied to the oxygen-containing gas supply passage 34a, and a fuel gas such as a hydrogen-containing gas is supplied to the fuel gas supply passage 38a. Further, a coolant such as pure water, ethylene glycol, or the like is supplied to the coolant supply passages 36a.

As shown in FIG. 5, the oxygen-containing gas flows from the oxygen-containing gas supply passage 34a to the oxygen-containing gas flow field 62 of the first gas diffusion current collector member 14 through the inlet channel 44a. In the oxygen-containing gas flow field 62, as shown in FIGS. 4 and 5, the oxygen-containing gas flow through a plurality of apertures of the porous surface 42a of the first gas diffusion current collector member 14, and is supplied to the cathode 28 of the membrane electrode assembly unit 30 for inducing an electrochemical reaction at the cathode 28.

The fuel gas flows from the fuel gas supply passage 38a to the fuel gas flow field 64 of the second gas diffusion current collector member 16 through the channel 54a. In the fuel gas flow field 64, the fuel gas flows through a plurality of apertures of the porous surface 52a of the second gas diffusion current collector member 16, and is supplied to the anode 26 of the membrane electrode assembly unit 30 for inducing an electrochemical reaction at the anode 26.

Thus, in each of the membrane electrode assembly units 30, the oxygen-containing gas supplied to the cathode 28, and the fuel gas supplied to the anode 26 are consumed in the electrochemical reactions at electrode catalyst layers of the cathode 28 and the anode 26 for generating electricity.

Then, the unconsumed oxygen-containing gas which has passed through the oxygen-containing gas flow field 62 flows through the outlet channel 44b, and is discharged into the oxygen-containing gas discharge passage 34b (see FIG. 5). Likewise, the unconsumed fuel gas which has passed through the fuel gas flow field 64 flows through the channel 54b, and is discharged into the fuel gas discharge passage 38b.

Further, as shown in FIG. 2, the insulating member 32 is interposed between the above-described membrane electrode assembly unit 30 and an adjacent membrane electrode assembly unit 30. The oxygen-containing gas and the fuel gas are also supplied to the adjacent membrane electrode assembly unit 30, and the power generation is carried out in the same manner.

The coolant supplied to the coolant supply passage 36a flows through the fuel cell 10 in the direction indicated by the arrow A. After the coolant cools each of the membrane electrode assembly units 30, the coolant is discharged into the coolant discharge passage 36b, and flows in the backward direction.

In the embodiment of the present invention, the electrolyte membrane/electrode web member 12 including the elongated solid polymer electrolyte membrane 24, and the anodes 26 and the cathodes 28 formed on both surfaces 24a, 24b of the solid polymer electrolyte membrane 24 is provided. Thus, by forming the electrolyte membrane/electrode web member 12 into the wave shape such that the solid polymer electrolyte membrane 24 is folded repeatedly, it is possible to arrange the membrane electrode assembly units 30 each having the anode 26 and the cathode 28 in parallel to each other in the direction indicated by the arrow A.

In the structure, simply by inserting the first and second gas diffusion current collector members 14, 16 from both sides of the electrolyte membrane/electrode web member 12, in effect, a plurality of unit cells can be stacked together easily and rapidly.

Further, each of the first and second gas diffusion current collector members 16, 14 is formed by folding the single electrically conductive plate in the substantially U-shape. Thus, electrons flows from the anode 26 to the cathode 28 through the electrically conductive plate itself, making it possible to effectively reduce the electrical resistance.

Further, simply by supplying the coolant along the coolant supply passage 36a provided in the first and second gas diffusion current collector members 14, 16, the metal thermal conductivity is utilized to achieve the uniform temperature in the surfaces of the first and second gas diffusion current collector members 14, 16.

Further, the insulating member 32 made of resin or the like is used, and the protrusions 60a, 60b are formed on both surfaces of the insulating member 32 to form the oxygen-containing gas flow field 62 or the fuel gas flow field 64. Thus, the insulating member 32 has the function of forming the flow field, in addition to the insulating function. Consequently, it is possible to reduce the number of components in the fuel cell 10, and reduce the overall dimension of the fuel cell 10 in the direction indicated by the arrow A effectively.

While the invention has been particularly shown and described with reference to a preferred embodiment, it will be understood that variations and modifications can be effected thereto by those skilled in the art without departing from the spirit and scope of the invention as defined by the appended claims.

What is claimed is:

1. A fuel cell comprising:

an elongated electrolyte membrane web consisting entirely of an ion exchange membrane;

at least two anodes separately provided on one surface of the elongated electrolyte membrane web;

at least two cathodes separately provided on the other surface of said elongated electrolyte membrane web;

an electrolyte membrane/electrode web member comprising the elongated electrolyte membrane web, the at least two anodes and the at least two cathodes;

first and second gas diffusion current collector members each formed by folding a single electrically conductive plate into a substantially U-shape, and having at least one porous surface facing said electrolyte membrane/electrode web member, the first and second gas diffusion current collector members being stacked in a stacking direction; and an electrically insulating member having a first reactant gas flow field on one surface facing the porous surface of the first gas diffusion current collector member and a second reactant gas flow field on an other surface facing the porous surface of the second gas diffusion current collector member, the first and second reactant gas flow fields being at opposite sides of the electrically insulating member in the stacking direction, wherein said electrolyte membrane/electrode web member is curved or bent in a wave shape such that said anode and said cathode are arranged in parallel to each other;

said first gas diffusion current collector member is inserted into said electrolyte membrane/electrode web member from one side to sandwich said electrolyte membrane/electrode web member, and said second gas diffusion current collector member is inserted into said electrolyte membrane/electrode web member from the other side to sandwich said electrolyte membrane/electrode web member;

said insulating member is placed in a space where said first gas diffusion current collector member and said second gas diffusion current collector member directly face each other; and the first and second reactant gas flow fields at opposite sides of the electrically insulating member are configured to allow flow of the same reactant gas.

2. A fuel cell according to claim 1, wherein a plurality of protrusions are formed on both the one and the other surfaces of said insulating member, and said protrusions contact said gas diffusion current collector members to form the first and second reactant gas flow fields.

3. A fuel cell according to claim 1, wherein a reactant gas passage connected to said reactant gas flow field, and extending through said gas diffusion current collector members in a stacking direction is provided for allowing a reactant gas to flow through said reactant gas passages.

4. A fuel cell according to claim 1, wherein a coolant passage extending through said gas diffusion current collector member in a stacking direction is provided for allowing a coolant to flow through said coolant passage.

5. A fuel cell according to claim 1, wherein the anode and cathode are located opposite each other on the electrolyte membrane and wherein there are at least two sets of anode and cathode on the electrolyte membrane.

6. A fuel cell comprising:
an elongated electrolyte membrane web consisting entirely of an ion exchange membrane;
at least two separate anodes on a first surface of the elongated electrolyte membrane web;
at least two separate cathodes on a second surface of said elongated electrolyte membrane web;
an electrolyte membrane/electrode web member comprising the elongated electrolyte membrane web, the at least two separate anodes and the at least two separate cathodes;
first and second gas diffusion current collector members, wherein each member comprises a single, folded, substantially U-shaped, electrically conductive plate, and wherein the first and second gas diffusion current collector members have at least one porous surface facing said electrolyte membrane/electrode web member, the first and second gas diffusion current collector members being stacked in a stacking direction;
an electrically insulating member with a first reactant gas flow field on one surface facing the porous surface of the first gas diffusion current collector member and a second reactant gas flow field on an other surface facing the porous surface of the second gas diffusion current collector member, wherein the first and second reactant gas flow fields are at opposite sides of the electrically insulating member in the stacking direction, wherein said electrolyte membrane/electrode web member is curved or bent in a wave shape such that said anode and said cathode are arranged parallel to each other;

wherein said first gas diffusion current collector member extends around said electrolyte membrane/electrode web member from a first side of the electrolyte membrane/electrode web member to sandwich the electrolyte membrane/electrode web member, and wherein said second gas diffusion current collector member extends around said electrolyte membrane/electrode web member from a second side of the electrolyte membrane/electrode web member, opposite the first side, to sandwich the electrolyte membrane/electrode web member;

wherein said insulating member is in a space where said first gas diffusion current collector member and said second gas diffusion current collector member directly face each other, and the first and second reactant gas flow fields at opposite sides of the electrically insulating member are configured to allow flow of the same reactant gas.

7. A fuel cell according to claim 6, wherein a plurality of protrusions are on both the one surface and the other surface of said insulating member, and said protrusions contact said gas diffusion current collector members to form the first and second reactant gas flow fields.

8. A fuel cell according to claim 6, wherein a reactant gas passage connected to said reactant gas flow field, and extending through said gas diffusion current collector members in a stacking direction is provided for allowing a reactant gas to flow through said reactant gas passages.

9. A fuel cell according to claim 6, wherein a coolant passage extends through said gas diffusion current collector member in a stacking direction to allow a coolant to flow through said coolant passage.

10. A fuel cell according to claim 6, wherein the anode and cathode are opposite each other on the electrolyte membrane and wherein there are at least two sets of anode and cathode on the electrolyte membrane.

11. A fuel cell according to claim 1, wherein the electrically insulating member separates the first reactant gas flow field from the second reactant gas flow field.

12. A fuel cell according to claim 6, wherein the electrically insulating member separates the first reactant gas flow field from the second reactant gas flow field.

13. A fuel cell according to claim 1, wherein each of the at least two anodes and the at least two cathodes are separate from the first and second gas diffusion current collector members.

14. A fuel cell according to claim 6, wherein each of the at least two anodes and the at least two cathodes are separate from the first and second gas diffusion current collector members.

* * * * *